Figure 1:
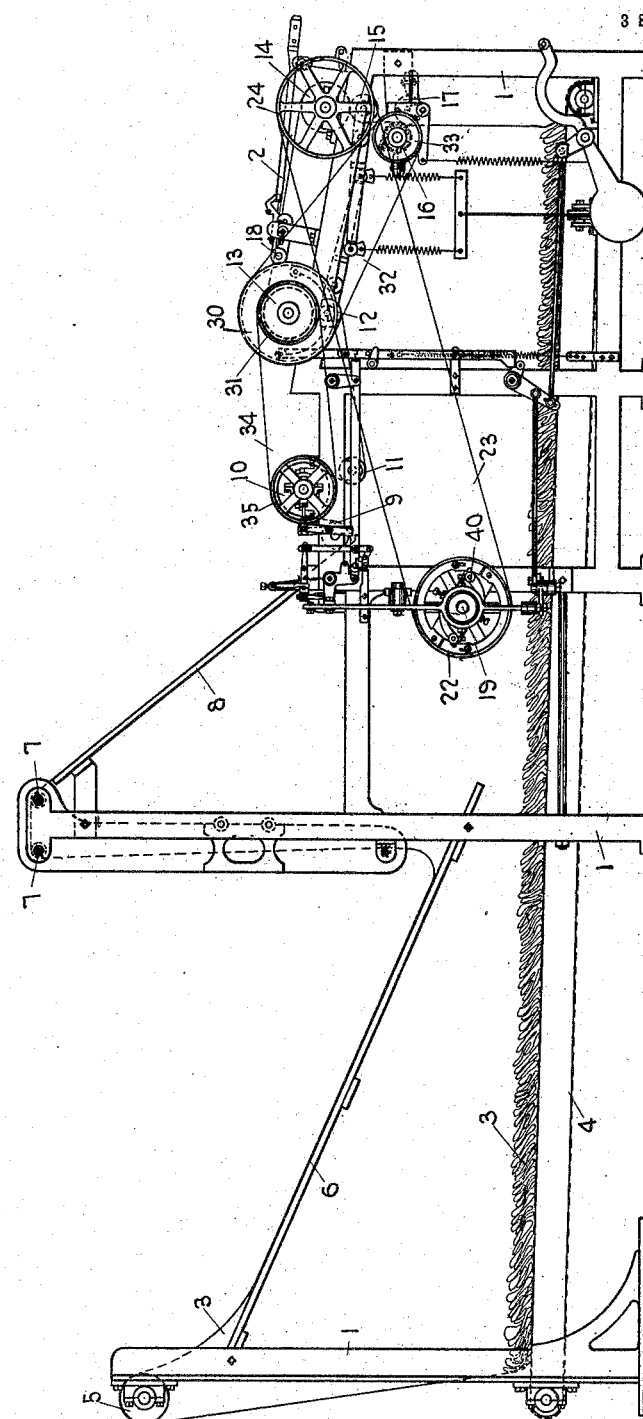

A. MORTON.
PILE CUTTING MACHINE.
APPLICATION FILED APR. 15, 1907.

980,991.

Patented Jan. 10, 1911.

3 SHEETS—SHEET 1.

WITNESSES
James H. Thurston
Katherine G. Bradley

INVENTOR
Arthur Morton,
BY Wilmarth H. Thurston,
ATTORNEY

A. MORTON.
PILE CUTTING MACHINE.
APPLICATION FILED APR. 15, 1907.
980,991.
Patented Jan. 10, 1911.
3 SHEETS—SHEET 2.
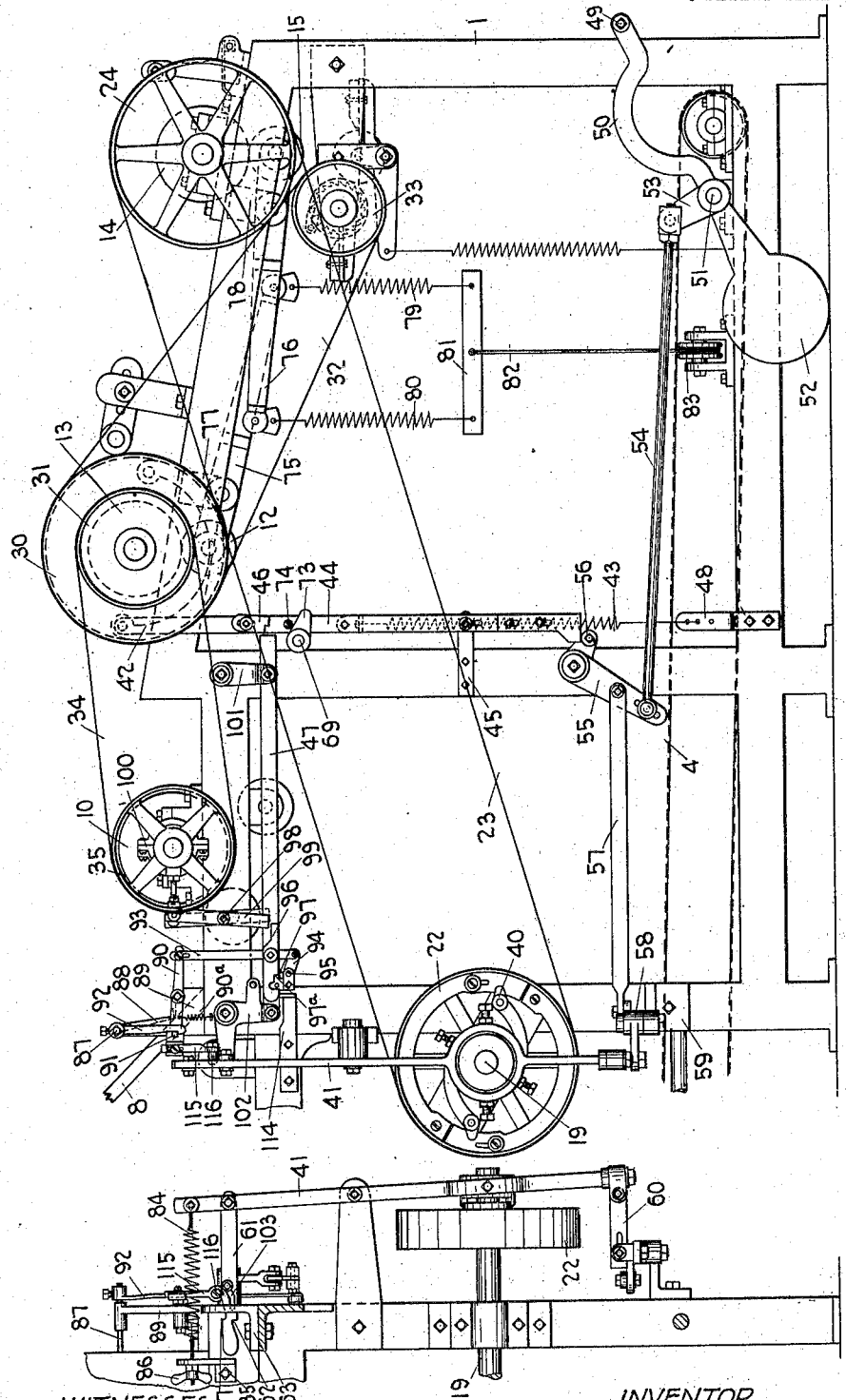

A. MORTON.
PILE CUTTING MACHINE.
APPLICATION FILED APR. 15, 1907.
980,991.
Patented Jan. 10, 1911.
3 SHEETS—SHEET 3.
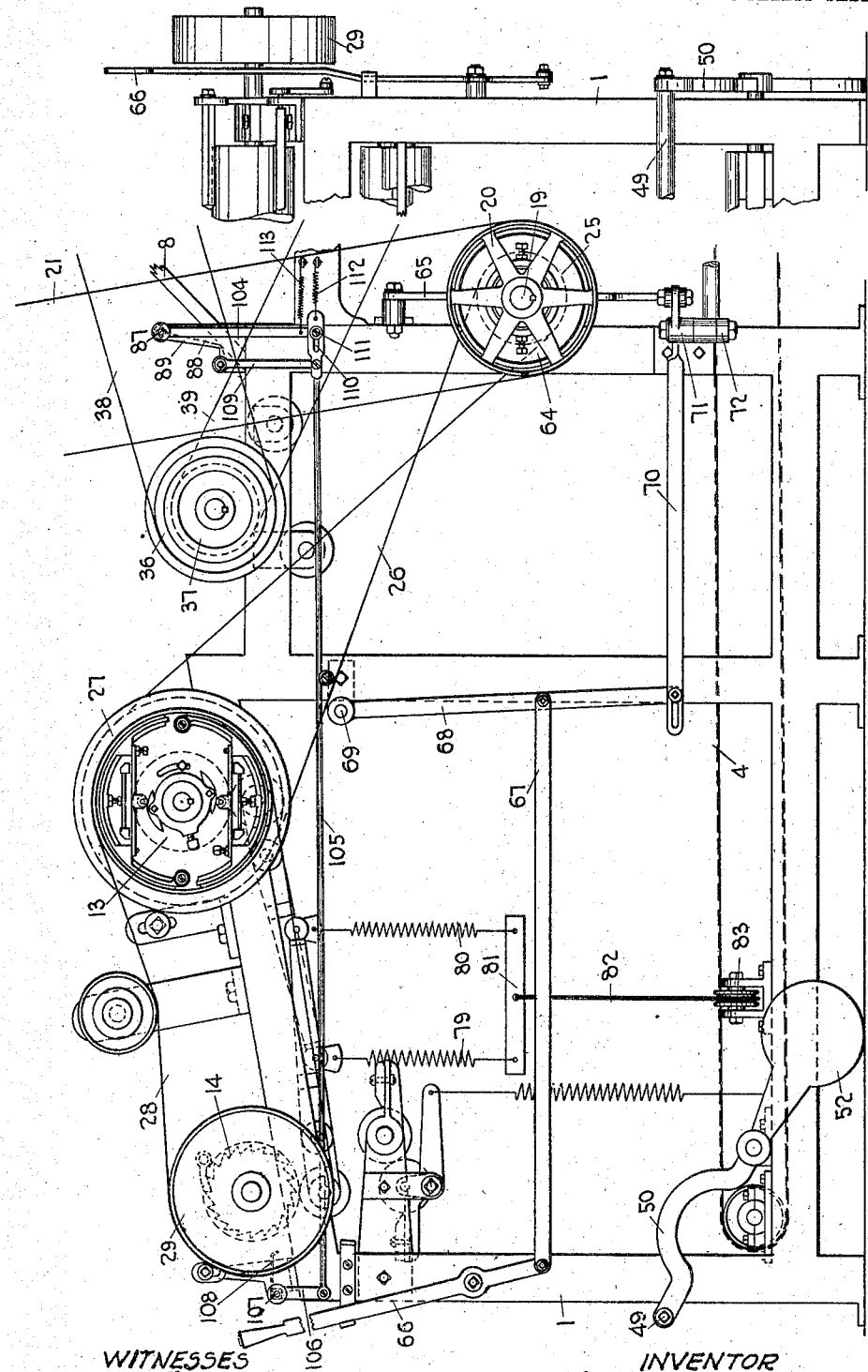
WITNESSES
James H. Thurston
Catherine G. Bradley
INVENTOR
Arthur Morton,
BY Wilmarth H. Thurston,
ATTORNEY

UNITED STATES PATENT OFFICE.

ARTHUR MORTON, OF WARWICK, RHODE ISLAND, ASSIGNOR TO CROMPTON COMPANY, OF PROVIDENCE, RHODE ISLAND, A CORPORATION OF RHODE ISLAND.

PILE-CUTTING MACHINE.

980,991.   Specification of Letters Patent.   Patented Jan. 10, 1911.

Application filed April 15, 1907. Serial No. 368,330.

*To all whom it may concern:*

Be it known that I, ARTHUR MORTON, of Warwick, in the county of Kent and State of Rhode Island, have invented certain new and useful Improvements in Pile-Cutting Machines; and I do hereby declare the following specification, taken in connection with the accompanying drawings, forming a part of the same, to be a full, clear, and exact description thereof.

The invention relates to a machine for cutting the race or pile of pile fabrics, such as velvets, corduroys, etc. of that character in which the fabric is caused to travel past one or more knives in the form of an endless web, and more particularly to a machine of this character especially designed for cutting velvets. When the fabric is thus caused to travel through the machine in the form of an endless web, such endless web is formed by uniting the ends of the fabric which result in the formation of a seam or bunch at the point of union through which the knife cannot pass.

The object of the present invention is to provide means for automatically stopping the machine and thus stopping the feed of the fabric when the seam or bunch referred to approaches the knife.

In another application Serial No. 368,329, filed Apr. 15, 1907, I have shown and described a pile-cutting machine of the character referred to provided with an electrical stop-motion for automatically stopping the machine and the feed of the fabric as the seam or bunch referred to approaches the knife. A mechanical stop-motion, if it can be made sufficiently sensitive and reliable to serve the purposes required, is in many respects preferable to an electric stop-motion, and for the reason that such mechanical stop-motion is necessarily simpler and less liable to get out of order.

I have now succeeded in devising a mechanical stop-motion which is sufficiently sensitive and reliable for automatically stopping the machine and the feed of the fabric when the seam or bunch referred to approaches the knife, and the present invention consists primarily in the combination with the other parts of the machine of devices, constituting a mechanical stop-motion, for automatically stopping the feed of the fabric when the seam or bunch referred to approaches the knife.

The invention further consists in the construction, combinations and arrangement of parts hereinafter described and claimed.

Referring to the drawings, Figure 1 is a side elevation of the left hand side of a pile-cutting machine embodying the invention. Fig. 2 is a corresponding side elevation on an enlarged scale of the forward end of the machine. Fig. 3 is an end elevation of the left hand end of Fig. 2. Fig. 4 is a corresponding side elevation of the right hand side of the forward portion of the machine. Fig. 5 is a front end elevation of Fig. 4.

The machine comprises a suitable frame 1 in which the several operating parts are mounted. The fabric travels through the machine in the form of an endless web. The knife 2 is located at the front of the machine, and the fabric 3, after the race has been cut, is carried down on to a traveling endless apron or lattice 4 at or near the bottom of the machine where it drops in folds, and in this form is carried by the traveling apron to the rear of the machine. From the apron at the rear of the machine the fabric is carried up over a feed-roll 5 and down an incline 6. At the foot of this incline the fabric turns upward and is carried over two fixed bars 7, 7, at the top of the frame. Preferably the fabric is left more or less loose at the point where its direction is changed from the foot of the incline to the vertical. From the stationary bars 7, 7, the fabric travels down another incline 8 around an idler roll 9, up over a positively driven roll 10, preferably rubber-covered, down around another idler roll 11, then forward around a tension roll 12, and around the drag-roll 13, then under the knife 2, and around the feed-roll 14 and the tension-roll 15, thence downward between a pair of supplemental feed-rolls 16, 17, the feed-roll 16 being positively driven and the feed-roll 17 being an idler roll, and thence down on to the traveling apron 4 above referred to. Preferably a stationary bar 18 is arranged between the drag-roll 13 and the feed-roll 14 in front of the free end of the knife for the purpose of supporting the fabric at or adjacent to the cutting point. This supporting bar is made adjustable toward and from the knife, as shown in Fig. 1. The necessary tension on the fabric at the cutting point is produced by means of the rolls 13 and 14. The feed-roll 14 is positively driven, while the drag-roll 13 is provided with a friction device to be hereinafter described, whereby a friction or drag may be put on said roll.

The main driving-shaft 19 is provided with a pulley 20 driven by a belt 21 from an overhead countershaft. On the opposite end of the driving-shaft 19 is a pulley 22 from which a belt 23 extends to a pulley 24 on the left hand end of the positively driven feed-roll 14. On the driving-shaft 19, adjacent to the main driving-pulley 20, is a pulley 25, from which a cross belt 26 extends to a loose pulley 27 on the drag-roll 13. The pulley 27 is a two-step cone-pulley and from the smaller step of said pulley a belt 28 extends to a pulley 29 on the right hand end of the feed-roll 14. The pulley 27 on the drag-roll 13 is somewhat larger than the pulley 29 on the feed-roll 14, and so that said pulley 27 rotates at a slower speed than the pulley 29. On the left hand end of the drag-roll 13 are two pulleys 30 and 31 shown in Fig. 1. From the pulley 30 a belt 32 extends around a pulley 33 on the left hand end of the driven supplemental feed-roll 16. From the pulley 31 a belt 34 extends to a pulley 35 on the left hand end of the driven roll 10. On the right hand end of said roll 10 are two pulleys 36 and 37. From the pulley 36 a belt 38 serves to drive the feed-roll 5, while from the pulley 37 a belt 39 serves to operate the endless apron 4.

The pulley 22 on the driving-shaft 19 is loose on said shaft, but is adapted to be connected with said shaft by a suitable clutch-mechanism, preferably a friction-clutch, as shown in the drawings. This clutch may be of any desired construction and as it forms no part of the present invention, the detailed construction of the clutch shown need not be described. It will be understood that when the pulley 22 is connected with the driving-shaft 19, the fabric will be fed through the machine and when the pulley 22 is disconnected from the shaft 19, the feed of the fabric will be stopped. The clutch-mechanism as a whole is designated as 45 in the drawings, and said clutch-mechanism is adapted to be operated by the lever 41.

In machines of this character it is desirable that when the driving power is disconnected for the purpose of stopping the machine, the machine should be quickly brought to a full stop, and so as to promptly stop the feed of the fabric. For this purpose a brake-mechanism is applied to some part of the feed-mechanism to quickly stop the feed of the fabric whenever the driving power is disconnected.

In the arrangement shown the brake is applied to the drag-roll 13, or rather to the pulley 30 on said roll. This brake may be of any suitable construction, and in the drawings is shown as comprising a pivoted brake-shoe 42, which is pivoted to the frame of the machine, and which is designed to be forced into contact with the inner surface of the flange of the pulley 30 by means of a coiled spring 43. The brake-shoe 42 is normally, or while the machine is in operation, latched out of contact with the pulley-flange. Connected to the free end of the brake-shoe is a vertical bar 44 which extends downward and is supported and guided by a bracket 45 extending from the frame of the machine. Adjustably secured to one side of this bar 44 is a notched block 46 adapted to engage or be engaged by the forward end of a movable bar 47. One end of the spring 43 is connected to said bar 44, the other end of said spring being connected to a bracket 48 on the frame. When the machine is running the bar 44 is latched and held in its upper position, and so as to hold the brake-shoe 42 out of contact with the flange of the pulley 30 by the end of the movable bar 47 engaging the notched block 46. When, however, said movable bar 47 is moved rearward by any suitable means, the bar 44 is thereby unlatched and is pulled downward by the spring 43, thereby forcing the brake-shoe into contact with the flange of the pulley 30, thereby stopping the feed of the fabric.

In the machine shown means are provided for automatically throwing out the clutch 40, and for automatically applying the brake 42, which means will be hereinafter described.

The means for releasing the brake and starting the machine to feed forward the fabric after the machine has been stopped and the brake applied will be next described. A foot-treadle 49 extends across the front of the machine where it may be conveniently operated. This treadle is secured by means of arms 50, one on each side of the machine, to a rock-shaft 51, which extends across the machine and is arranged to turn in bearings in the frame. Connected to this rock-shaft are two weights 52, one on each side of the machine, which act to normally hold the treadle 49 in its upper position. Secured to the rock-shaft 51 is an arm 53, to which is connected one end of a connecting rod 54, the other end of which rod is connected to one arm of a bell-crank lever 55 which is pivoted on the frame. The other arm of this bell-crank lever is provided with a friction-roll 56 which underlies the lower end of the vertical bar 44 which is connected to the brake-shoe. When the bell-crank lever 55 is rocked by depressing the treadle 49, one result will be to lift the brake-shoe 42 out of contact with the flange of the pulley 30 and thus release the brake.

Connected to the arm of the bell-crank lever 55 to which the rod 54 is connected is another connecting-rod 57, the opposite end of which is connected to one arm of a bell-crank lever 58, which is pivoted on a bracket 59 projecting from the frame of the machine. The other arm of the bell-crank lever 58 is connected by a link 60 with the lower end of the clutch-lever 41. When, therefore, the treadle is depressed and the bell-crank lever 55 is rocked, the further result will be that the bell-crank lever 58 will be correspondingly rocked, and this in turn will serve to pull inward the lower end of the clutch-lever 41 and thus throw in the clutch 40 and connect the pulley 22 to the driving-shaft 19. Pivoted to the clutch-lever 41 is a latch-bar 61, provided with a shoulder 62, adapted to engage a bracket 63, through a slot in which bracket the end of the latch-bar 61 extends. When the clutch 40 is thrown in to connect the pulley 22 with the shaft 19, the upper end of the clutch-lever 41 is moved away from the bracket 63, and so as to draw the latch-bar 61 outward and into a position where the shoulder 62 on said latch-bar will engage said bracket, and thereby latch and hold the clutch in its engaged position. The weight of the latch-bar 61 will ordinarily be sufficient to cause said bar to fall down and engage the latch. If desired, however, a spring may be employed for this purpose.

It is desirable in machines of this character to provide means to reverse the machine and the feeding of the fabric, in order that if the knife should fly out of the race, or any other accident happen, the fabric may be run back a short distance for the purpose of reinserting the knife in the race. This reversal of the machine is effected by means of the cross-belt 26 running on one of the steps of the cone-pulley 27 on the drag-roll 13. This cross-belt 26 is operated by the pulley 25 which is loose on the main driving-shaft 19, but which is provided with a clutch 64 adapted to be operated by a lever 65 for clutching said pulley to said driving-shaft.

The means for operating this clutch 64 are as follows: Pivoted to the frame of the machine at the forward end thereof is a hand-lever 66, the handle of which is in convenient position to be grasped by the operator. The lower end of this lever is connected by a link 67 to an arm 68 projecting from a rock-shaft 69 which extends across the machine and is mounted in bearings in the frame. The lower end of the arm 68 is connected by a link 70 to one arm of a bell-crank lever 71 which is pivoted on a bracket 72 secured to the frame of the machine. The other end of this bell-crank lever 71 is connected to the lower end of the clutch-lever 65, which clutch-lever is pivoted at its other end to the frame. With this construction, as will be seen, when the upper end of the hand-lever 66 is pushed rearward, the result will be, through the operation of the connecting parts, that the clutch will be thrown in and the pulley 25 thus connected to the driving-shaft 19, and so as to drive the drag-roll 13 in the reverse direction.

As when the machine is stopped the brake is on, it is necessary whenever it is desired to start the machine in the reverse direction that the brake should first be thrown off. It is for this purpose that the rock-shaft 69 is extended across the machine, and this rock-shaft is provided at its opposite end with an arm 73 which underlies a friction roller 74 on the vertical bar 44 which is connected with the brake-shoe 42 which engages the flange of the pulley 30 on the drag-roll. Consequently whenever the rock-shaft 69 referred to is rocked by pushing rearward the hand-lever 66, the rocking of said shaft will serve to lift the brake-shoe 42 out of contact with the pulley-flange and thus release the brake. It is preferred to provide a certain amount of lost motion in the connection between the lower end of the arm 68 and the link 70 in order to insure that the brake shall be released before the reversing-clutch is thrown in.

The purpose of the two idler-rolls 12 and 15 is to hold the fabric up in contact with the drag-roll 13 and the feed-roll 14 respectively. It is desirable to maintain the axis of each of said rolls 12 and 15 parallel with the axis of its companion roll, and it is also desirable that the grip on the fabric between the feed-roll 14 and its binding-roll 15, and the grip of the fabric between the drag-roll 13 and its binding-roll 12, shall be substantially uniform. In order to secure these results the machine is provided with an equalizing device designed to maintain the two binding-rolls 12 and 15 in proper relation with the rolls 13 and 14 respectively.

Each of the rolls 12 and 15 is mounted in movable bearings, these bearings being formed in levers 75, 76, pivoted one at each side of the machine. Referring to Fig. 2, which shows the two levers at one side of the machine, one for each of said rolls, it will be seen that the lever 75 is pivoted to the frame of the machine at 77, and that the lever 76 is similarly pivoted at 78. The drag-roll 13 is mounted in one arm of the lever 75 and its companion lever on the opposite side of the machine, while the feed-roll 14 is mounted in one arm of the lever 76 and its companion lever at the opposite side of the machine. The opposite arms of the levers 75, 76, cross each other as shown. The free ends of said levers are connected by coiled springs 79, 80, with an equalizing bar 81. Connected to the center of this equalizing bar is a cord 82 which extends around the pulley 83 located one on each side of the machine, and is connected to the center of a corresponding equalizing bar 81 on the opposite side of the machine.

It will be understood that the arrangement of levers, springs and equalizing bar is the same on both sides of the machine. By this construction the upward pressure of the two binding-rolls 12 and 15 poduced by the four coiled springs referred to is equalized, and is such that the axis of each binding-roll will be maintained parallel with the axis of its companion roll, and so that each binding-roll will also be caused to grip the fabric uniformly throughout the length of said rolls, provided of course the surface of the rolls are uniform and true.

The means for automatically throwing out the clutch 40 and for automatically applying the brake 42, and which means constitute an automatic stop-motion adapted to be operated by the bunch or seam in the fabric will next be described.

In order to stop the machine and to apply the brake so as to promptly stop the feed of the fabric, it is only necessary to operate the clutch-lever 41, the operation of which lever, as above described, will serve both to throw out the clutch 40 and to apply the brake 42. As above described, when the clutch-lever 41 is operated to throw in the clutch 40, said clutch and lever are latched in engaging position by the latch-bar 61, or by the engagement of the shoulder 62 on said bar with the bracket 63. To the upper end of the clutch-lever 41 is connected one end of a coil-spring 84, the other end of which spring is connected to a bracket 85 by means of an adjusting screw 86. When the clutch-lever 42 is moved to engage the clutch 40, the spring 84 is put under tension, and said spring is held under such tension by the engagement of the latch-bar 61 with the bracket 63. In order to throw out the clutch 40, therefore, it is only necessary to disengage said latch-bar 61 when the clutch-lever 41 will be moved by said spring 84 in the direction to throw out the clutch 40.

The means for automatically disengaging the lever 61 from engagement with the bracket 63 are as follows: Extending across the machine above the fabric, whereby the fabric comes down the incline 8, is a rock-shaft 87 which carries a flat leaf-spring 88, which spring likewise extends across the machine and normally lies in engagement with the fabric.

Pivoted to the bracket 89 is a lever 90 provided at one end with a projection 91 adapted to be engaged by a latch formed on the end of the arm 92 carried by the rock-shaft 87. The opposite end of said lever 90 is connected by a link 93 with an arm 94 carried by a rock-shaft 95 suitably mounted in fixed supports. The rock-shaft 95 is provided with an upwardly projecting arm or toe 97 arranged to normally underlie one end of a pivoted lever or tappet 96 pivoted on the bar 47. The tappet 97 is provided with a notch 97$^a$ adjacent to the toe 96 when the parts are in normal position.

Pivoted on the frame at 98 are two levers 99 lying side by side. As the construction and operation of these two levers and their connecting and coöperating parts are the same, it will be sufficient to describe the construction and operation of one of said levers.

Mounted on the shaft of the driven roll 10 is an eccentric 100 which is connected with the upper end of the lever 99, whereby said lever is vibrated back and forth at each revolution of said shaft.

The bar 47 before referred to extends lengthwise of the machine, said bar being pivotally connected at one end to the pivoted link 101, and being pivotally connected at its other end to one arm of a bell-crank lever 102. Said bar 47 is thus capable of a lengthwise swinging movement and is adapted to operate said bell-crank lever. The tappet 97 pivoted on said bar 47 is normally held in a horizontal position by the engagement therewith of the toe 96, and when thus held in a horizontal position the forward end of said tappet will be out of the path of the vibrating lever 99. The other arm of the bell-crank lever 102 projects through an inclined slot or cam-slot 103 in the latch-bar 61 pivoted to the clutch-lever 41.

The operation of the automatic stop-motion above described is as follows: As the bunch or seam in the fabric travels down the incline 8 it will serve by engagement with the spring-arm 88 to rock the shaft 87 and the arm 92 and to thereby disengage the latch on the end of said arm 92 from the projection 91 on the lever 90, which will permit the rear end of said lever to fall, or if desired a spring 90$^a$ may be employed to pull downward the rear end of said lever 90 when the latch 92 is disengaged. The resulting upward movement of the forward end of said lever 90 will serve through the connecting link 93 and arm 94 to rock the shaft 95, and so as to move the toe 96 from beneath the tappet 97, or to a point in line with the notch 97$^a$ in said tappet and so as thus to permit the rear end of said tappet to fall. This will cause the forward end of said tappet to be raised into the path of the lower end of the vibrating lever 99. As the lower end of said lever 99 moves rearward, the engagement of said lever with the tappet 97 will cause the bar 47 to be moved rearward and so as to turn the bell-crank lever 102. The turning of said bell-crank lever will, by the engagement of the end of said lever with the cam-slot 103, serve to unlatch the latch-bar 61, whereupon the clutch-lever 41 will be operated by the spring 84 to throw out the clutch 40 and thereby disconnect the pulley 22 from the shaft 19. As will be understood, whenever the clutch 40 is thus thrown out by the operation of the clutch-lever 41, the brake 42 will be simultaneously applied through the intermediate connections hereinbefore described.

As above stated, two levers 99 and two tappets 97 are preferably employed. The purpose in thus employing two levers and two tappets is to insure greater promptness in stopping the machine. Thus with the eccentrics 100, which operate the levers 99, set opposite to each other, the lower ends of said levers will always be moving in opposite directions, and so that one of said levers will always be moving in a direction to engage its tappet.

It is desirable that means shall also be provided for stopping the machine by hand, which means will next be described. Connected to the rock-shaft 87 at the opposite or right hand side of the machine is an arm 104 the lower end of which is connected by a connecting rod 105 with an arm 106 secured to a rock-shaft 107 suitably mounted at the front of the machine, and which extends across the machine. Projecting rearwardly from said rock-shaft is a plate 108 which preferably likewise extends across the machine, and so that it may be conveniently reached by the operator from any point at the front of the machine.

In order to increase the sensitiveness of the automatic stop-motion above described, it is preferred to support the rear end of the connecting rod 105 independently of the arm 104, and so as to relieve said arm of the weight of said connecting rod. As shown in the drawings, the rear end of said connecting rod 105 is supported by a link 109, one end of which link is pivotally connected to said rod 105, and the other end pivotally connected to the frame or to a bracket thereon.

In order that the automatic stop-motion may operate without having to move the connecting-rod 105 and the parts connected therewith, lost motion is provided between the arm 104 and the rod 105, and for this purpose the rod 105 is provided with a slot 110 in which the pin 111 on the lower end of the arm 104 works. A spring 112 is connected to the rear end of the rod 105 for returning said rod and the parts connected therewith to their normal position when they have been operated by hand, and a separate spring 113 is connected to the arm 104 to return said arm, and the parts connected therewith to their normal position when they have been operated either by hand or automatically. Means are also provided for automatically resetting the parts of the stop-motion mechanism, which means are as follows: Secured to the frame is a bracket 114 having a projecting arm which lies in the path of the pivoted tappet 97, and the rear end of said tappet is beveled, so that as the bar 47 moves rearward, the beveled end of the tappet, coming in contact with the arm of the bracket 114, will cause said tappet to be lifted, thus lifting the notch 97$^a$ clear of the toe 96.

Adjustably secured to the rear end of the lever 90 is an arm 115 carrying at its lower end of a roll 116. The latch-bar 61 is provided on its upper edge with a cam-surface 117 with which the roller 116 is kept in contact by the action of the spring 90$^a$. When the latch-bar 61 is unlatched and the upper end of the clutch-lever 41 is moved inward by the spring 84, said latch-bar 61 will likewise be moved inward, which will cause the roll 116 to ride up the cam-surface 117, which will cause the rear end of the lever 90 to be moved upward and the forward end of said lever downward, which through the link 93 and arm 94 will serve to rock the shaft 95 and so as to return the toe 96 to its normal position beneath the tappet 97, the rear end of which tappet has in the meantime been raised, as above described. The several parts of the automatic stop-motion will thus be automatically reset and so that said parts will be restored to their proper positions for the next operation of the automatic stop-motion without the necessity for any hand manipulation.

What I claim as my invention and desire to secure by Letters Patent is:

1. In a pile cutting machine, a stop motion mechanism adapted to be operated by a bunch or seam in the fabric and comprising two members moving constantly in opposite directions, two tappets normally out of the path of said moving members, and means controlled by said bunch or seam for mechanically causing said tappets to be brought one into the path of one of said moving members and the other into the path of the other moving member.

2. In a pile cutting machine, a stop motion mechanism adapted to be operated by a bunch or seam in the fabric and comprising two members moving constantly in opposite directions, two tappets, means for normally holding said tappets out of the path of said moving members, and means controlled by said bunch or seam for mechanically causing said tappets to be brought one into the path of one of said moving members and the other into the path of the other moving member.

3. In a pile cutting machine, a stop motion mechanism adapted to be operated by a bunch or seam in the fabric and comprising two members moving constantly in opposite directions, two tappets, a latch for normally holding said tappets out of the path of said moving members, and means controlled by said bunch or seam for mechanically releasing said latch.

4. In a pile cutting machine, the combination of a driving shaft, a feed-roll, a clutch for connecting and disconnecting said feed-roll and said shaft, a single latch for said clutch, a movable bar adapted to unlatch said latch, and means controlled by a bunch or seam in the fabric and adapted to mechanically bring about the operation of said movable bar.

5. In a pile cutting machine, the combination of a driving shaft, a feed roll, a clutch for connecting and disconnecting said feed roll and said shaft, a latch for said clutch, a brake, a latch for said brake, said latches being separately operable a movable bar adapted to unlatch both of said latches, and means controlled by a bunch or seam in the fabric and adapted to mechanically bring about the operation of said movable bar.

6. In a pile cutting machine, the combination of a driving shaft, a feed roll, a clutch for connecting and disconnecting said feed roll and said shaft, a latch for said clutch, a brake, a movable bar constituting a latch for said brake, said movable bar being also adapted to unlatch the latch for said clutch, and means controlled by a bunch or seam in the fabric and adapted to mechanically bring about the operation of said movable bar.

7. In a pile cutting machine, a stop motion mechanism comprising two members moving constantly in opposite directions, a movable bar adapted to disconnect the power which operates the machine, two tappets adapted to operate said movable bar, means for normally holding said tappets out of the path of said moving members, and means controlled by a bunch or seam in the fabric for mechanically releasing said tappets.

8. In a pile cutting machine, a stop motion mechanism comprising two members moving constantly in opposite directions, a movable bar adapted to disconnect the power which operates the machine, two tappets carried by said movable bar, means for normally holding said tappets out of the path of said moving members, and means controlled by a bunch or seam in the fabric for mechanically releasing said tappets.

9. In a pile cutting machine, a stop motion mechanism comprising two members moving constantly in opposite directions, a movable bar adapted to disconnect the power which operates the machine, two tappets adapted to operate said movable bar, a latch for normally holding said tappets out of the path of said moving members, and a plate adapted to be operated by a bunch or seam in the fabric to release said latch.

10. In a pile cutting machine, the combination of a driving shaft, a feed roll, a clutch for connecting and disconnecting said feed roll and said shaft, a clutch lever for operating said clutch, a latch carried by said clutch lever, a movable bar adapted to unlatch said latch, and means controlled by a bunch or seam in the fabric and adapted to mechanically bring about the operation of said movable bar.

11. In a pile cutting machine, the combination of a driving shaft, a feed roll, a clutch for connecting and disconnecting said feed roll and said shaft, a single latch for said clutch, a movable bar adapted to unlatch said latch, a constantly moving member, a tappet carried by said movable bar, and means controlled by a bunch or seam in the fabric and adapted to mechanically bring said tappet into engagement with said constantly moving member to operate said movable bar.

12. In a pile cutting machine, the combination of a driving shaft, a feed roll, a clutch for connecting and disconnecting said feed roll and said shaft, a latch for said clutch, a brake, a movable bar constituting a latch for said brake, said movable bar being also adapted to unlatch the latch for said clutch, a constantly moving member, a tappet carried by said movable bar, and means controlled by a bunch or seam in the fabric and adapted to mechanically bring said tappet into engagement with said constantly moving member and thereby operate said movable bar to unlatch both said clutch and said brake.

ARTHUR MORTON.

Witnesses:
W. H. THURSTON,
J. H. THURSTON.